Patented Feb. 15, 1949

2,461,704

UNITED STATES PATENT OFFICE 2,461,704

ADHESIVE AND COATING COMPOSITION

Fred B. Speyer, Salem, Mass., assignor to Shellmar Products Corporation, Mount Vernon, Ohio, a corporation of Delaware No Drawing. Application November 23, 1945, Serial No. 630,561

1 Claim. (Cl. 260—736)

The present invention relates to an improved adhesive and coating composition. More particularly, it pertains to a novel type of formulation for a new pressure sensitive, grease-proof type of adhesive suitable for laminating and combining purposes as applied to a wide variety of plastic films, paper and foils, and the provision of such a composition is a principal object of the invention.

Conventional pressure sensitive adhesives are usually made specific for a particular type of plastic film, paper or foil. Their application to the types of materials to which they can be applied for laminating and combining purposes is exceedingly limited because of the fact that the various properties and characteristics essential to a universal composition have never heretofore been successfully combined so as to permit of any degree of comprehensive application. When attempts are made to apply conventional specific adhesives and coating compositions to various types of similar and dissimilar foils, plastic films, and papers, and to combine these materials with each other, as well as to other surfaces, it has been found that they lack the combined properties of greaseproofness, waterproofness, relative water-vaporproofness, cohesive strength and strong bonding and adhesion characteristics.

Generally, it is an object of the present invention to provide an adhesive and coating composition of matter which will overcome the foregoing difficulties and disadvantages.

More specifically, it is an object of the present invention to provide a novel type of adhesive and coating composition of matter containing as essential ingredients a polymerized vegetable oil and a chlorinated rubber which will combine all types of similar and dissimilar papers, foils or plastic films, and which is adapted to combine plastic films to papers and foils, the amount of the ingredients present being in such proportion as to impart to the films to which the composition is applied such characteristics as pressure sensitivity, greaseproofness, relative moisture-vaporproofness and strong adhesive bonds to hold such films together.

Another important object of the invention is to provide a pressure sensitive, greaseproof adhesive.

Other objects of the invention will in part be obvious and will in part appear hereinafter.

The invention accordingly comprises a composition of matter possessing the characteristics, properties and the relation of components which will be exemplified in the composition hereinafter described and the scope of the application of which will be indicated in the claims.

The composition may be formulated by combining a suitable polymerized vegetable oil, such as linseed, tung oil, or the like, with chlorinated (natural or synthetic) rubber. A suitable commercial type of polymerized vegetable oil now obtainable on the market is Kem-Pol #14 made by Sherwin-Williams Company. More particularly, "Kem-Pol" is a trade name of the Sherwin-Williams Company which is applied to a plastic-like vegetable oil polymerization product. It is an amber, viscous, tacky, gel-like material, soluble in aromatic or aliphatic hydrocarbons, easily emulsified and capable of being stabilized by addition of protective colloids such as casein or protein. The Kem-Pols are capable of being compounded with loaders, plasticizers, accelerators, curing agents and antioxidants to form a rubber-like product capable of being milled and vulcanized. After being cured, such a compounded product gives a tensile strength of 300 to 500 pounds per square inch, elongation of 100 to 150 per cent, durometer hardness of 40 to 70, and an elasticity of 50 to 25, thus being capable of substitution for rubber in many hard and semi-hard rubber products.

A chlorinated rubber suitable for practicing the present invention may be a commercial type of product such as that known as Parlon sold on the market today and is made by The Hercules Company.

The amounts of each ingredient to be used in the composition may vary, depending upon the degree of polymerization of the oil, the type of oil, the degree of polymerization and chlorination of the rubber and the type of rubber used. These characteristics can readily be determined by one skilled in the art. The oil and rubber composition should be dissolved in a solvent, preferably ethyl acetate, or various combinations of ethyl acetate, methyl ethyl ketone, aromatic hydrocarbons or chlorinated solvents. In other words, solvents or solvent schemes which might adversely affect the stock to which the composition is applied should not be used.

There may be also incorporated in the composition small amounts of wax which will considerably improve the moisture-vapor resistance without noticeably affecting the other properties. The composition is compatible with a wide variety of both microcrystalline and amorphous waxes.

Chlorinated rubber is brittle and not sensitive to pressure. It does, however, impart excellent cohesive strength characteristics to the composition.

The addition of the vegetable oil polymer also acts as a plasticizer and softening agent for the composition. Its chief characteristics is that it is greaseproof. The combination of the vegetable oil polymer and the chlorinated rubber are particularly resistant to mineral and vegetable oils and greases.

The resulting adhesive or coating composition can be applied, for example, to Saran film (polyvinylidene chloride) to provide a greaseproof pressure sensitive tape which can be wound up on a spool and readily unwound without permitting transfer of the adhesive to the back of the tape. It is significant that with a small amount of pressure the tape may be bonded to Saran or other films and give good adhesive strength. In the wrapping of greased articles, such as motor parts where a large amount of grease is used, precision instruments of various kinds, etc., most adhesives are adversely affected by the grease whereas the adhesive embodied by the present invention is not at all affected.

The present composition has many other outstanding features and advantages. It has excellent low temperature flexibility, or plastic bonding characteristics, will provide good adhesion and will not delaminate under severe temperature conditions, even as low as −15° F. The addition of larger portions of the vegetable oil polymer further improves flexibility at considerably lower temperatures.

The adhesive can be used as a pressure sensitive laminant for all types of films, papers, and foils in all combinations. For example, materials which have successfully been coated and combined in this manner are represented by such products as glassine, kraft, parchment, ordinary unbleached paper, sized paper, bleached paper, cellophane (waterproof and plain), cellulose acetate, polythene, polyvinylidene chloride, vinyl films, Plio-film, cellulosic films, lead and aluminum foils, and the like.

The adhesive softens only slightly at elevated temperatures and delamination is not noticeably affected at temperatures as high as 200° F. Decomposition, volatilization, polymerization, oxidation nor any other detrimental effect takes place on aging, or migration failure, even at elevated temperatures.

It is significant that neither of the two basic constituents of this composition, namely, the polymerized vegetable oil and the chlorinated rubber, give cohesive and adhesive strength when used separately but when combined as taught by the present invention, this property results. Typical examples of such formulations are as follows:

Example I

| | Parts |
|---|---|
| Polymerized linseed oil | 6 |
| Chlorinated rubber (visc. 125 cps.) | 1 |
| Ethyl acetate | 8 |

Example II

| | Parts |
|---|---|
| Polymerized linseed oil | 5.0 |
| Chlorinated rubber (visc. 125 cps.) | 1.0 |
| Micro-crystalline wax | .5 |
| Ethyl acetate | 5.0 |
| Toluene | 1.0 |

Example III

| | Parts |
|---|---|
| Polymerized linseed oil | 4 |
| Chlorinated rubber (visc. 85 cps.) | 1 |
| Toluene | 4 |
| Methyl ethyl ketone | 2 |

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

A pressure sensitive greaseproof adhesive type laminant composition of matter of the following formulation:

| | Parts |
|---|---|
| Polymerized linseed oil | about 5.0 |
| Chlorinated rubber (125 cps) | about 1.0 |
| Micro crystalline wax | about .5 |
| Ethyl acetate | about 5.0 |
| Toluene | about 1.0 |

FRED B. SPEYER.

REFERENCES CITED

The following references are of record in the file of this patent:

UNITED STATES PATENTS

| Number | Name | Date |
|---|---|---|
| 1,635,812 | Boehmer | July 12, 1927 |
| 2,090,140 | Murray | Aug. 17, 1937 |
| 2,164,359 | Strauch | July 4, 1939 |
| 2,172,974 | Hills | Sept. 12, 1939 |